| (12) United States Patent | (10) Patent No.: US 11,454,598 B2 |
| Takahashi | (45) Date of Patent: Sep. 27, 2022 |

(54) THERMAL CONDUCTIVITY DETECTOR

(71) Applicant: SHIMADZU CORPORATION, Kyoto (JP)

(72) Inventor: Kazunori Takahashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 1019 days.

(21) Appl. No.: 16/082,817

(22) PCT Filed: Mar. 7, 2016

(86) PCT No.: PCT/JP2016/056921
§ 371 (c)(1),
(2) Date: Sep. 6, 2018

(87) PCT Pub. No.: WO2017/154059
PCT Pub. Date: Sep. 14, 2017

(65) Prior Publication Data
US 2020/0300794 A1 Sep. 24, 2020

(51) Int. Cl.
*G01N 25/18* (2006.01)
*G01N 30/66* (2006.01)

(52) U.S. Cl.
CPC ............ *G01N 25/18* (2013.01); *G01N 30/66* (2013.01)

(58) Field of Classification Search
CPC ............................... G01N 25/18; G01N 30/66
USPC .................... 374/44, 208, 148, 141
See application file for complete search history.

(56) References Cited

U.S. PATENT DOCUMENTS

| 3,888,110 A | 6/1975 | Clark |
| 4,254,654 A | 3/1981 | Clouser et al. |
| 4,361,802 A | 11/1982 | Luijpers |
| 8,313,236 B2 * | 11/2012 | Barth .................. G01N 27/18 374/44 |
| 2016/0103105 A1 * | 4/2016 | Nakama ............... G01N 25/18 73/23.4 |

(Continued)

FOREIGN PATENT DOCUMENTS

| CN | 202814872 U | 3/2013 |
| JP | 49-006236 B2 | 2/1974 |

(Continued)

OTHER PUBLICATIONS

Communication dated Mar. 30, 2020, from the China National Intellectual Property Administration in Application No. 201680081590.2.

(Continued)

*Primary Examiner* — Mirellys Jagan
(74) *Attorney, Agent, or Firm* — Sughrue Mion, PLLC (57) ABSTRACT

A thermal conductivity detector (TCD) includes: a detection channel through which a gas to be measured flows as a fluid; a thermal conduction part that has a filament provided at a position in the detection channel where the filament comes into direct contact with the fluid flowing through the detection channel, thereby conducting heat through the fluid flowing through the detection channel; and a detection circuit for detecting an electric signal based on a change in a voltage or a current of the filament. The thermal conduction part has a plurality of filament sections that are substantially parallel to a flow direction of the fluid flowing through the detection channel.

5 Claims, 13 Drawing Sheets

(56) References Cited

U.S. PATENT DOCUMENTS

2020/0088662 A1* 3/2020 Takahashi .............. G01N 25/18

FOREIGN PATENT DOCUMENTS

| | | |
|---|---|---|
| JP | 5022917 B1 | 8/1975 |
| JP | 53-046091 A | 4/1978 |
| JP | 5647748 A | 4/1981 |
| JP | 62-046364 U | 3/1987 |
| JP | 07-043356 A | 2/1995 |
| JP | 2010230591 A | 10/2010 |
| JP | 2011-169778 A | 9/2011 |
| JP | 2011-179851 A | 9/2011 |
| WO | 2010035803 A1 | 4/2010 |
| WO | WO-2019123525 A1 * | 6/2019 ............. G01N 25/18 |

OTHER PUBLICATIONS

Communication dated Oct. 8, 2019 from the Japanese Patent Office in application No. 2018-503855.
Communication dated Jun. 4, 2019, from the Japanese Patent Office, in counterpart application No. 2018-503855.
International Search Report of PCT/JP2016/056921 filed May 24, 2016.

* cited by examiner

FILAMENT FOLDED BACK MULTIPLE TIMES

THERMAL CONDUCTIVITY DETECTOR

This application is a National Stage of International Application No. PCT/JP2016/056921 filed Mar. 7, 2016.

TECHNICAL FIELD

The present invention relates to a thermal conductivity detector (TCD).

BACKGROUND ART

For example, a TCD has been known as a detector used in gas chromatography. A TCD detects heat conduction from a heating element (filament) to a fluid (gas) flowing around the heating element. The gas is introduced into a detection channel in which the filament is accommodated, and is then discharged from the detection channel.

Some TCDs are referred to as a gas switching type (see Patent Document 1, for example). In this type of TCD, a pressure difference caused by changing inflow parts of a reference gas is used, to control whether a gas (column gas) from a separation column or the reference gas is introduced, as a gas to be measured, into a detection channel in which a measuring filament is provided. Thereafter, a difference signal of the gases is retrieved.

PRIOR ART DOCUMENTS

Patent Documents

Patent Document 1: Japanese Patent Laid-open Publication No. S53-046091
Patent Document 2: Japanese Patent Laid-open Publication No. H7-043356

SUMMARY OF THE INVENTION

Problems to be Solved by the Invention

The detection sensitivity of a TCD can be improved, by increasing the length of a filament that conducts heat between the filament and a fluid, and increasing the contact area of the filament with the fluid. In the TCD disclosed in Patent Document 1, a filament is provided to have a linear shape. Hence, to increase the length of the filament, the length of a detection channel in which the filament is placed needs to be increased. However, the length of a detection channel is limited by the size of the entire TCD, and a detection channel long enough to place a long filament cannot be ensured in some cases.

There is also a problem that a longer detection channel requires longer time for a gas to be measured to pass therethrough, whereby the peak shape of the chromatogram is widened. Moreover, in a gas switching type TCD in which a gas to be measured flowing through a detection channel is switched between a column gas and a reference gas at predetermined time periods, the gas around a filament needs to be replaced entirely within the predetermined time period. For these reasons, the length of a filament has been limited to several tens of millimeters.

One conceivable method for solving the above problem is to add a makeup gas to the gas (gas to be measured) from the separation column, to increase the flow rate of gas flowing through the detection channel and increase the flow velocity of gas. By increasing the flow velocity of gas flowing through the detection channel, widening of the peak shape can be suppressed. However, addition of the makeup gas dilutes the sample contained in the column gas, which results in deterioration in signal strength and detection sensitivity. Hence, the detection sensitivity cannot be improved.

To increase the length of a filament without increasing the length of a detection channel, coiling of the filament has been proposed and carried out (for example, see Patent Document 2). This can increase the contact area between the filament and a fluid flowing through the detection channel, so that the detection sensitivity can be improved.

The present invention aims to make improvements in the above TCD, and an object thereof is to improve an S/N ratio by improving detection sensitivity as in the case of a coiled filament, and reducing noise.

Solutions to the Problems

A thermal conductivity detector (TCD) of the present invention includes: a detection channel through which a gas to be measured flows as a fluid; a thermal conduction part that has a filament provided at a position in the detection channel where the filament comes into direct contact with the fluid flowing through the detection channel, thereby conducting heat through the fluid flowing through the detection channel; and a detection circuit for detecting an electric signal based on a change in a voltage or a current of the filament. The thermal conduction part has a plurality of filament sections that are substantially parallel to a flow direction of the fluid flowing through the detection channel.

The thermal conduction part may be configured in such a way that the single one filament is folded back at least once in a direction substantially parallel to the flow direction of the fluid flowing through the detection channel. Alternatively, the thermal conduction part may be configured in such a way that the plurality of filaments substantially parallel to the flow direction of the fluid flowing through the detection channel are electrically connected with each other in series or in parallel.

The TCD is a direct flow type, and the fluid may flow substantially parallel to the plurality of filament sections on an entire surface of the plurality of filament sections.

The filament may be formed of a metal wire. If the detection channel is formed by the micro electro mechanical systems (MEMS) technique, the filament may be formed of a metal film provided on an insulating base.

Effects of the Invention

In the TCD of the present invention, the thermal conduction part conducting heat through the fluid flowing through the detection channel has a plurality of filament sections substantially parallel to the flow direction of the fluid flowing through the detection channel. Hence, the overall length of the filament can be increased without increasing the length of the detection channel, and the detection sensitivity can be improved. Additionally, the cross-sectional area of the filament in a direction perpendicular to the flow direction of the fluid flowing through the detection channel is smaller than that of a coiled filament. Hence, noise caused by a change in the flow rate of the fluid can be suppressed. Since this improves signal strength S and suppresses noise N, the S/N ratio of the detection signal can be improved.

EMBODIMENT OF THE INVENTION

Hereinafter, an embodiment of the present invention will be described in detail with reference to the drawings.

Figure 1:
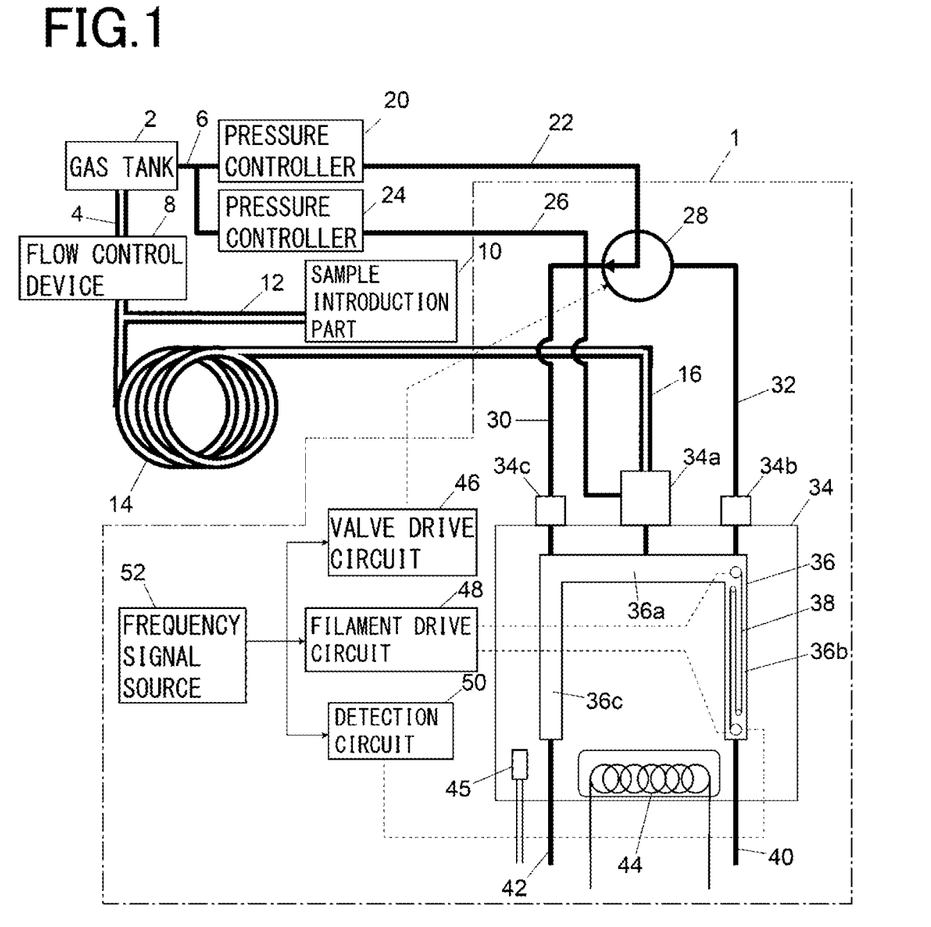
FIG. 1 is a schematic configuration diagram for describing an example of a gas chromatograph including an embodiment of a TCD.

An example of a gas chromatograph including an embodiment of a TCD will be described with reference to FIG. 1.

In this gas chromatograph, a measurement sample is turned into a column gas by being introduced and heated by a sample introduction part 10, passed through a sample gas channel 12, and mixed with a carrier gas supplied from a gas tank 2 and whose flow rate is adjusted by a flow control device 8. The column gas is introduced into a separation column 14, is separated into components, and is then introduced into a TCD 1 through a column gas channel 16.

Additionally, a channel 6 from the gas tank 2 branches into a reference gas channel 22 and a makeup gas channel 26. Pressure controllers 20 and 24 are provided at the reference gas channel 22 and the makeup gas channel 26, respectively. The reference gas channel 22 and the makeup gas channel 26 are connected to the TCD 1, and a gas from the gas tank 2 is introduced into the TCD 1 as a reference gas and a makeup gas.

The TCD 1 includes a switching valve 28, a cell block 34, a valve drive circuit 46, a filament drive circuit 48, a detection circuit 50, and a frequency signal source 52. In the cell block 34, not only a detection channel 36 is provided, but also a heater 44 and a temperature sensor 45 are buried to keep the temperature of the cell block 34 at a predetermined temperature.

The detection channel 36 is a U-shaped channel including channels 36b and 36c that are substantially parallel to each other, and a channel 36a that connects ends of the channels 36b and 36c. Of the ends of each of the channels 36b and 36c, the end on the side (upper side in FIG. 1) connected to the channel 36a is referred to as a base end part, and the end on the opposite side (lower side in FIG. 1) is referred to as a tip end part.

In the channel 36b of the detection channel 36, a filament 38 extending in the longitudinal direction of the channel 36b is provided, at a position where the filament 38 comes into direct contact with a fluid. The filament 38 forms a thermal conduction part that conducts heat between the filament and a fluid flowing through the channel 36b of the detection channel 36. The filament 38 has multiple filament sections that are substantially parallel to the flow direction of the fluid flowing through the channel 36b, and the overall length of the filament conducting heat between the filament and the fluid flowing through the channel 36b is longer than the longitudinal length of the channel 36b. As the TCD 1, the embodiment adopts a so-called direct flow type in which the fluid flows on the surface of the filament 38. In the configuration, the fluid flows substantially parallel to the multiple filament sections of the filament 38, on the entire surface of the multiple filament sections. A specific configuration of the filament 38 will be described later.

The cell block 34 includes an inlet port 34a for the column gas and the makeup gas, and inlet ports 34b and 34c for the reference gas. The inlet port 34a is connected to a center part of the channel 36a. The inlet port 34b is connected to the base end part of the channel 36b, and the inlet port 34c is connected to the base end part of the channel 36c. A discharge channel 40 is connected to the tip end part of the channel 36b, and a discharge channel 42 is connected to the tip end part the channel 36c.

The column gas channel 16 and the makeup gas channel 26 are connected to the inlet port 34a. Channels 30 and 32 are connected to the inlet ports 34c and 34b, respectively. Each of the channels 30 and 32 is connected to a port of the switching valve 28. The reference gas channel 22 is connected to the switching valve 28. The switching valve switches to decide whether to introduce the reference gas into the detection channel 36 through the channel 30 or through the channel 32.

The column gas from the separation column 14 is introduced into the detection channel 36 from the center part of the channel 36a through the inlet port 34a, together with the makeup gas from the makeup gas channel 26. When the reference gas is introduced through the inlet port 34c, the pressure is higher in the base end part on the channel 36c side than the base end part on the channel 36b side. Accordingly, the column gas introduced into the detection channel 36a flows through the channel 36b. The column gas having flowed through the channel 36b is discharged to the outside through the discharge channel 40.

Conversely, when the reference gas is introduced through the inlet port 34b, the pressure is higher in the base end part on the channel 36b side than the base end part on the channel 36c side. Accordingly, the column gas introduced into the detection channel 36a flows through the channel 36c. The column gas having flowed through the channel 36c is discharged to the outside through the discharge channel 40. At this time, only the reference gas flows through the channel 36b.

The switching valve 28 is switched under control of the valve drive circuit 46. The valve drive circuit 46 switches the switching valve 28 by receiving signals in a predetermined cycle from the frequency signal source 52.

The filament drive circuit 48 applies a voltage to the filament 38. The filament drive circuit 48 controls the voltage applied to the filament 38, so that the current flowing through the filament 38 is constant, or the resistance value of the filament is constant.

The detection circuit 50 measures the voltage applied to the filament 38. The detection circuit 50 synchronizes the measurement timing by receiving a signal from the frequency signal source 52. Thus, the voltage of the filament 38 is detected in synchronization with the switch timing of the switching valve 28.

Hereinafter, the filament 38 that forms the thermal conduction part will be described.

When the calorific value of the filament 38 is $Q_f$, the voltage applied to the filament 38 is $V_f$, and the current flowing through the filament 38 is $I_f$, $Q_f$ is basically expressed by the following Equation (1).

$$Q_f = V_f I_f \quad (1)$$

In addition, a heat release $Q_{f\_dis}$ from the filament 38 is expressed by the following Equation (2).

$$Q_{f\_dis} = (T_f - T_w)\alpha\cdot\lambda + (T_f - T_{gas})\beta\cdot m\cdot C_p \quad (2)$$

Here, $T_f$ indicates the average temperature of the filament 38, $T_w$ indicates the wall temperature of the channel 36b in which the filament 38 is placed, $T_{gas}$ indicates the temperature of a gas to be measured introduced into the detection channel 36b in which the filament 38 is placed, $\lambda$ indicates the thermal conductivity of the gas to be measured flowing through the channel 36b in which the filament 38 is placed, m indicates the flow rate of the gas to be measured flowing through the channel 36b in which the filament 38 is placed, $\alpha$ indicates the sensitivity coefficient for the thermal conductivity of the gas to be measured, and $\beta$ indicates the sensitivity coefficient for the flow rate of the gas to be measured. $C_p$ indicates the molar heat at constant pressure of the gas to be measured. Note that $\alpha$ and $\beta$ depend on the shape of the filament 38 and the shape of the channel 36b in which the filament 38 is placed.

Since the calorific value $Q_f$ of the filament coincides with a heat release $Q_{f\_out}$ thereof, the following equation holds.

$$Q_f = Q_{f\_dis} \quad (3)$$

According to the aforementioned Equations (1), (2), and (3), when the thermal conductivity $\lambda$ of the gas to be measured changes, the calorific value $Q_f$ of the filament 38 changes, and therefore the voltage $V_f$ applied to the filament 38 and the current $I_f$ flowing through the filament 38 change. Accordingly, it is possible to measure a change in the thermal conductivity $\lambda$ of the gas to be measured, by detecting $V_f$ or $I_f$ as a signal by the detection circuit 50.

According to the aforementioned Equation (2), in order to improve the S/N ratio of the detection signal, the sensitivity coefficient $\alpha$ for the thermal conductivity $\lambda$ of the gas to be measured should be increased, and an increase in the sensitivity coefficient $\beta$ for the flow rate m of the gas to be measured and for the input gas temperature $T_{gas}$, which cause noise, should be suppressed. The sensitivity coefficient $\alpha$ for the thermal conductivity can be increased by increasing the overall length of the filament 38. Meanwhile, the sensitivity coefficient $\beta$ for the flow rate m increases with an increase in the cross-sectional area of the filament 38 in a direction perpendicular to the flow direction of the gas to be measured.

As has been described, the filament 38 of the example has multiple parts (filament sections) substantially parallel to the flow direction of the fluid flowing through the detection channel 36. Hence, the part of the filament 38 that conducts heat between itself and the fluid is made longer than when the filament is linear, with no excessive increase in the cross-sectional area of the filament 38 in the direction perpendicular to the flow direction of the fluid. Thus, the sensitivity coefficient $\alpha$ for the thermal conductivity is improved, while an increase in the sensitivity coefficient $\beta$ for the flow rate m is suppressed.

As mentioned earlier, noise in the TCD is caused by a change in the flow rate m and the input gas temperature $T_{gas}$. The larger the sensitivity coefficient $\alpha$ for the thermal conductivity is than the sensitivity coefficient $\beta$ for the flow rate, the greater the improvement in the S/N. Accordingly, a shape of the filament that improves the S/N of a detection signal can be obtained by calculation.

The amount of heat radiated from the filament is expressed by the following equation.

$$Q_{f\_dis} = (T_f - T_w)\alpha\cdot\lambda + (T_f - T_{gas})\beta\cdot m\cdot C_p \quad (2)$$

The first term of the above Equation (2) indicates thermal conduction from the filament to a channel wall through the gas to be measured, and when this is expressed as $Q_{f\_dis\_w}$, the following equation holds.

$$Q_{f\_dis\_w} = (T_f - T_w)\alpha\cdot\lambda \quad (4)$$

Meanwhile, the second term of the above Equation (2) indicates the amount of heat dissipated from the filament by the gas to be measured, and when this is expressed as $Q_{f\_dis\_out}$, the following equation holds.

$$Q_{f\_dis\_out} = (T_f - T_{gas})\beta\cdot m\cdot C_p \quad (5)$$

It can be understood from Equations (4) and (5) that $\alpha$ is proportional to $Q_{f\_dis\_w}$ and $\beta$ is proportional to $Q_{f\_dis\_out}$, when the filament temperature $T_f$, the cell block temperature $T_w$, the influent gas temperature $T_{gas}$, and the influent gas flow rate m are constant. Therefore, in numerical analysis using the finite element method, $Q_{f\_dis\_w}$ and $Q_{f\_dis\_out}$ are obtained by keeping the filament temperature $T_f$, the cell block temperature $T_w$, the influent gas temperature $T_{gas}$, and the influent gas flow rate m constant. Then, a filament shape in which the ratio between $Q_{f\_dis\_w}$ and $Q_{f\_dis\_out}$ is large is obtained.

Figure 12:
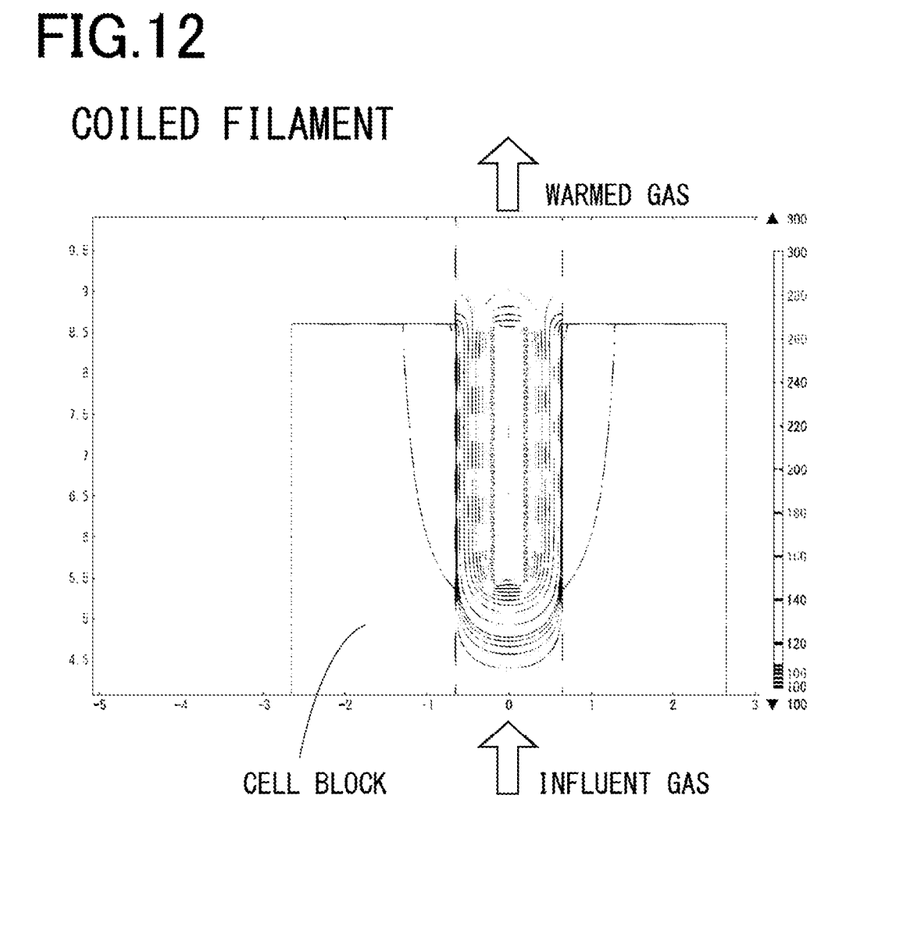
FIG. 12 is a temperature distribution indicating a result of numerical analysis of a coiled filament.
Figure 13:
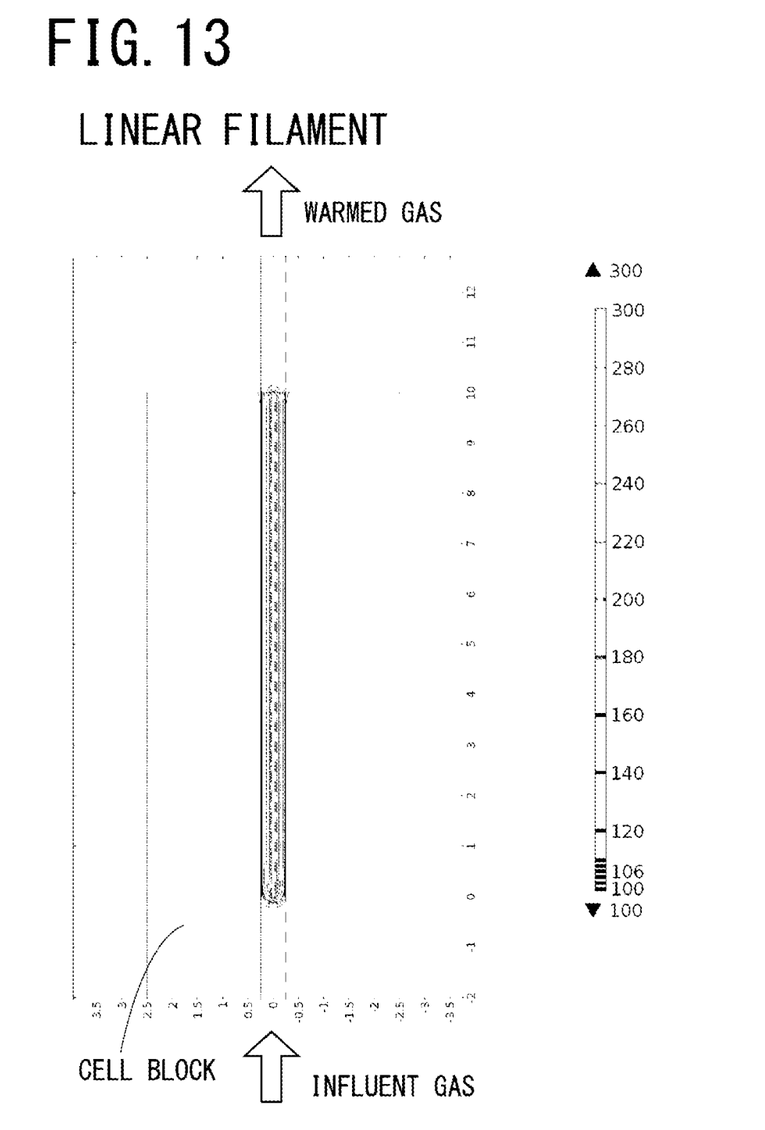
FIG. 13 is a temperature distribution indicating a result of numerical analysis of a linear filament.
Figure 14:
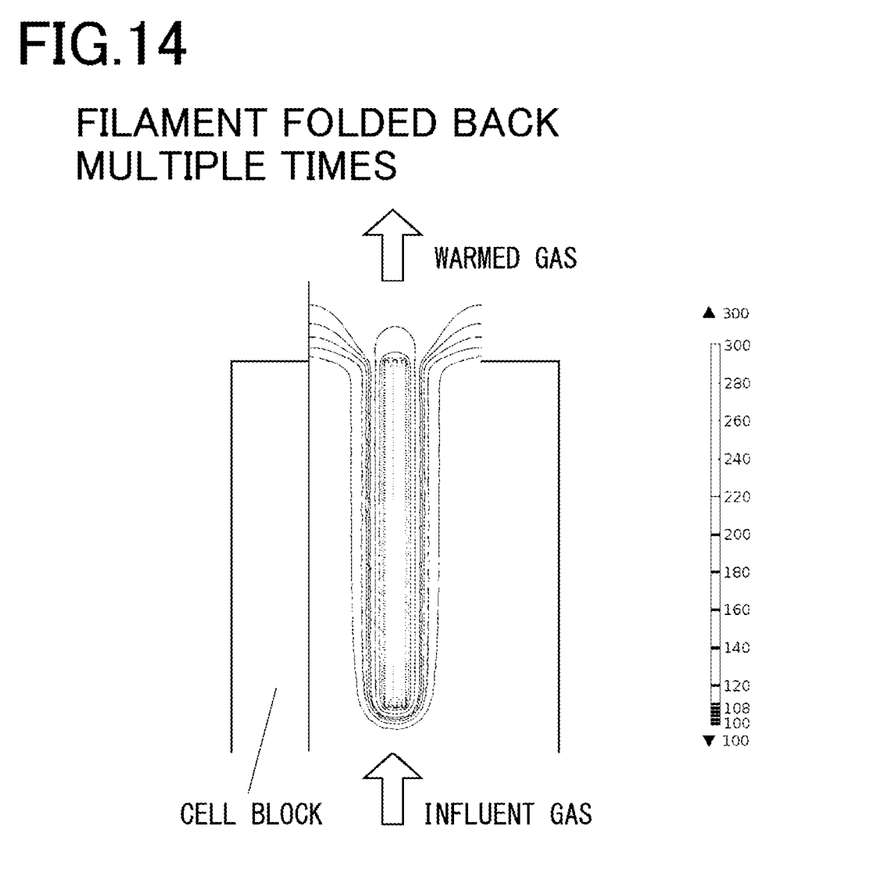
FIG. 14 is a temperature distribution indicating a result of numerical analysis of a filament folded back multiple times.

Numerical analysis using the finite element method was made under the following conditions, for a coiled filament, a linear filament, and a filament folded back multiple times.
Filament temperature $T_f$: 207° C.
TCD cell temperature $T_w$: 100° C.
Influent gas: helium
Influent gas temperature $T_{gas}$: 100° C.
Influent gas flow rate m: 25 ml/min FIGS. 12, 13, and 14 are temperature distributions indicating results of numerical analysis of a coiled filament (45 turns, overall length 56.6 mm), a linear filament (overall length 10 mm), and a filament folded back multiple times (folded back twice, three filament sections, 0.25 mm spacing between filament sections, overall length 10 mm), respectively. This result was used to calculate the sum total of the heat flux to the cell block channel wall, to obtain the thermal conduction $Q_{f\_dis\_w}$ from the filament through the gas, and $Q_{f\_dis\_out}$ by the gas based on the difference in gas temperature between the inlet and outlet of a channel in the cell block and the flow rate of gas. The result is shown in Table 1.

TABLE 1

| Filament shape | Thermal conduction through gas $Q_{f\_dis\_w}$ [W] | Convective heat transfer $Q_{f\_dis\_out}$ [W] | $Q_{f\_dis\_w}/Q_{f\_dis\_out}$ |
|---|---|---|---|
| Coiled (45 turns, overall length 56.5 mm) | 0.8137 | 0.0501 | 16.2415 |
| Linear (overall length 10 mm) | 0.7056 | 0.0224 | 31.5127 |
| Multiple foldbacks (pitch 0.25 mm, overall length 10 mm, three filament parts) | 2.8124 | 0.0237 | 118.7176 |

As can be seen from Table 1, the coiled filament has a long overall length 56.5 mm, but has a smaller $Q_{f\_dis\_w}/Q_{f\_dis\_out}$ than the linear filament, and does not have a good S/N. On the other hand, the filament folded back multiple times has better thermal conduction $Q_{f\_dis\_w}$ through the gas than the linear filament, and substantially the same $Q_{f\_dis\_out}$. Hence, $Q_{f\_dis\_w}/Q_{f\_dis\_out}$ is improved. Accordingly, it has been found that a better S/N than a coiled filament or a linear filament can be achieved, by folding back a filament multiple times, for example, and forming multiple filament sections substantially parallel to the flow direction of the fluid.

Specific configuration examples of the filament 38 as a thermal conduction part will be described below.

Figure 2A:
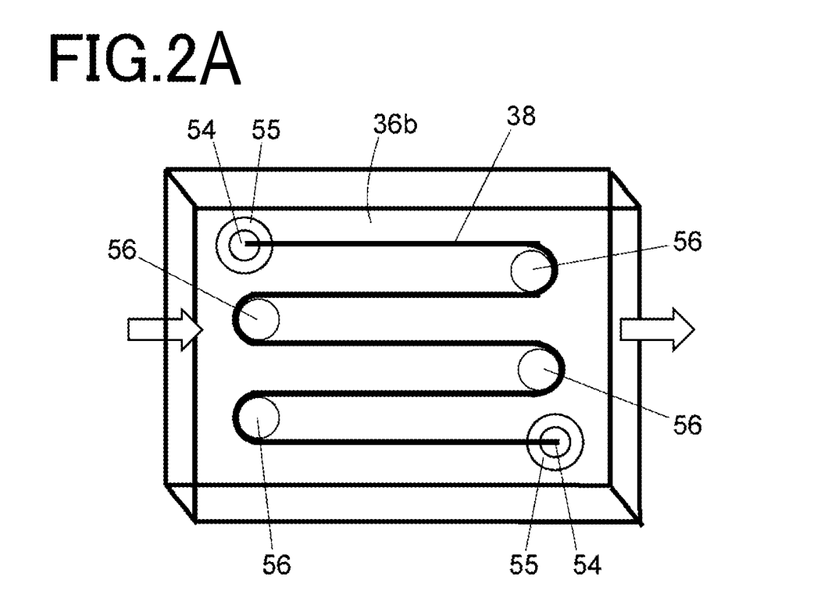
FIG. 2A is a plan view of an example of a configuration of a filament placed in a detection channel.
Figure 2B:
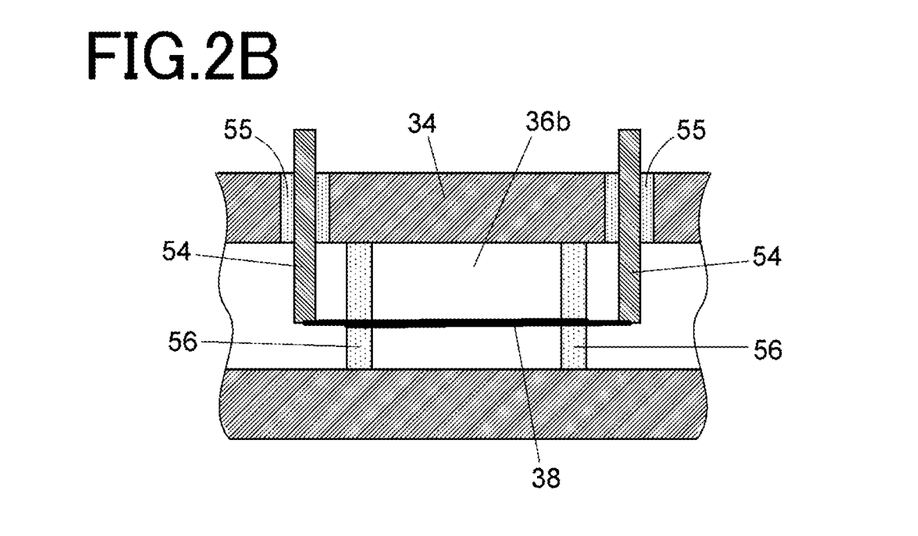
FIG. 2B is a cross-sectional view cut across a flow direction of a fluid in FIG. 2A
Figure 3A:
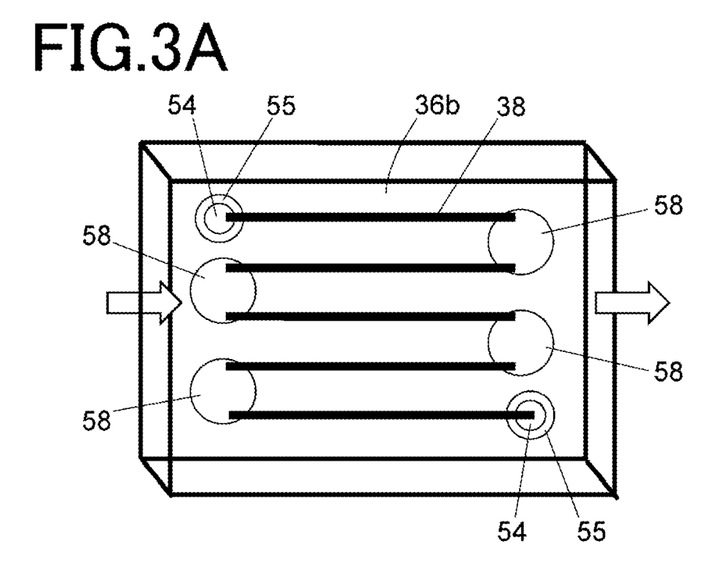
FIG. 3A is a plan view of another example of a configuration of a filament placed in a detection channel.
Figure 3B:
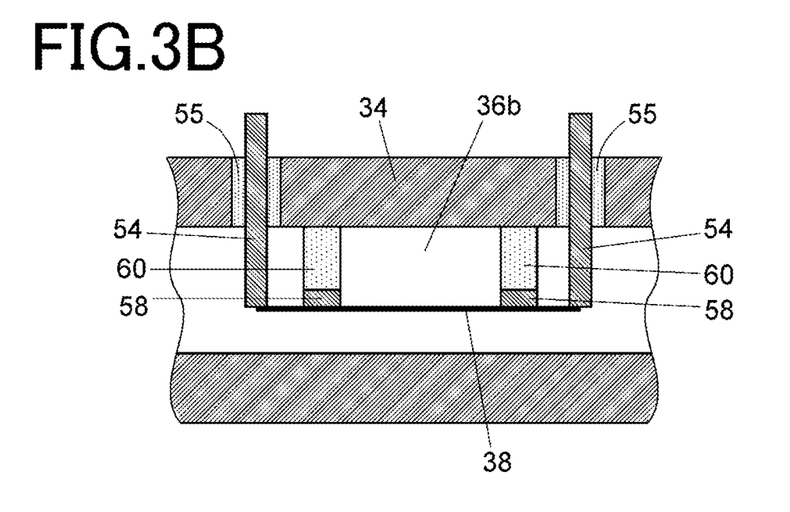
FIG. 3B is a cross-sectional view cut across a flow direction of a fluid in FIG. 3A.

As one configuration example of a filament 38, FIGS. 2A and 2B illustrate an example in which a filament 38 made of one metal wire is folded back multiple times in the flow direction of a fluid, to form multiple parts substantially parallel to the flow direction of the fluid flowing through a detection channel 36. In this example, a conductive pin 54 is provided one each on the upstream side and the downstream side of a channel 36b, and multiple insulating pins 56 are also provided on the upstream side and the downstream side of the channel 36b. Of the filament 38, intermediate parts are hooked on the insulating pins 56 and folded back, and both ends are fixed by the conductive pins 54. The conductive pin 54 is supported by an insulator 55, so as not to electrically connect with a housing of a cell block 34. A filament drive circuit 48 and a detection circuit 50 are connected to the conductive pin 54.

As a configuration example similar to that in FIGS. 2A and 2B, FIGS. 3A and 3B illustrate an example in which multiple filaments 38 made of multiple metal wires parallel to the flow direction of a fluid are arranged in the width direction of a channel 36b, and the filaments 38 are connected in series through conductive pins 58. The conductive pin 58 is provided only to electrically connect ends of two filaments 38, and do not require electrical connection with an external circuit. Hence, the conductive pin 58 is attached to an inner wall of a cell block 34 through an insulating pin 60.

Figure 4A:
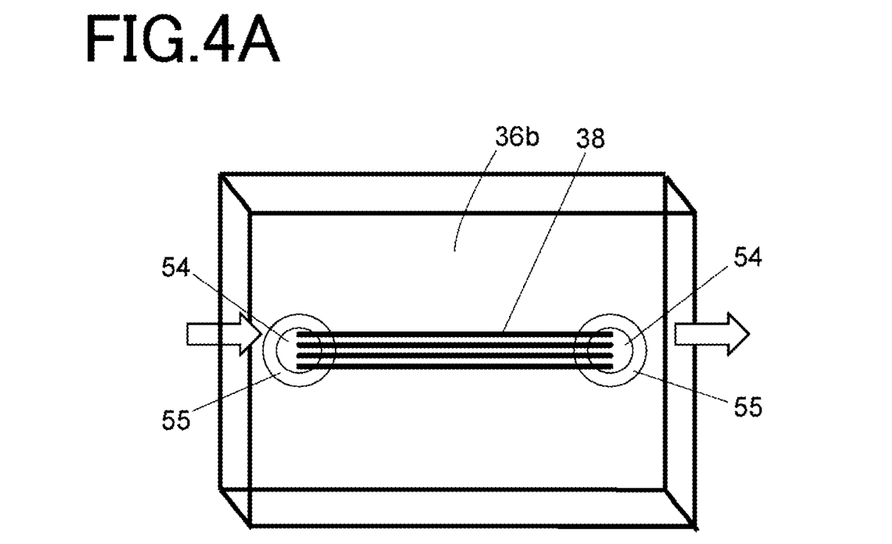
FIG. 4A is a plan view of yet another example of a configuration of a filament placed in a detection channel.
Figure 4B:
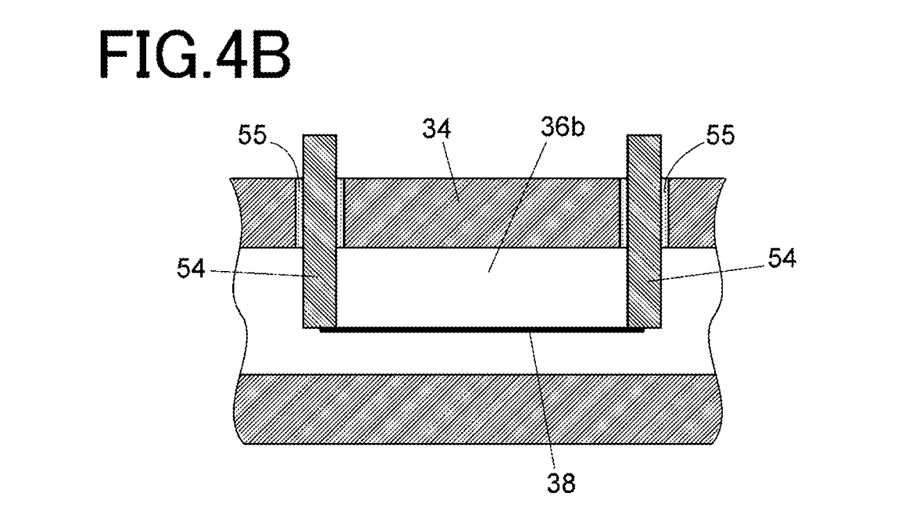
FIG. 4B is a cross-sectional view cut across a flow direction of a fluid in FIG. 4A.

Note that as illustrated in FIGS. 4A and 4B, multiple filaments 38 made of multiple metal wires parallel to the flow direction of a fluid may be arranged in the width direction of a channel 36b, and the filaments 38 may be connected in parallel by fixing ends of the filaments 38 with a common conductive pin 54.

Figure 5A:
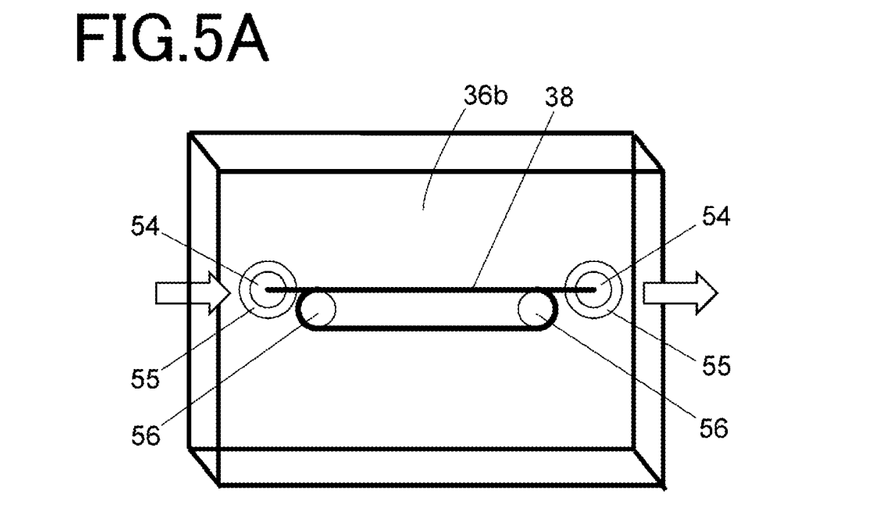
FIG. 5A is a plan view of yet another example of a configuration of a filament placed in a detection channel.
Figure 5B:
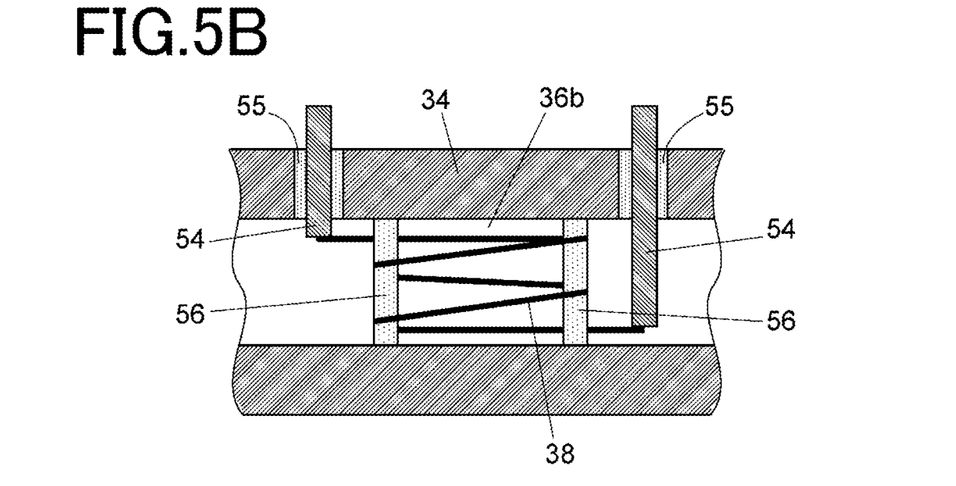
FIG. 5B is a cross-sectional view cut across a flow direction of a fluid in FIG. 5A.

As illustrated in FIGS. 5A and 5B as a more simple configuration, a filament 38 made of a metal wire may be wound around the outer periphery of two insulating pins 56 arranged along the flow direction of a fluid, with both ends of the filament 38 fixed to conductive pins 54. In this configuration, the number of insulating pins 56 can be reduced as compared to the example of FIGS. 2A and 2B. In these configurations as well, the filament 38 has multiple parts substantially parallel to the flow direction of the fluid flowing through the channel 36, and a sensitivity coefficient α for the thermal conductivity of the fluid can be improved.

Figure 6:
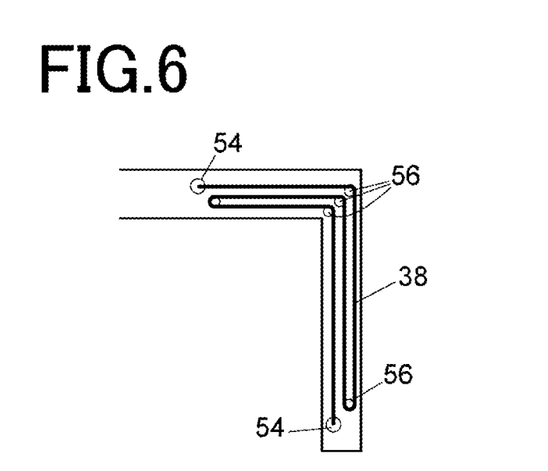
FIG. 6 is a plan view of yet another example of a configuration of a filament placed in a detection channel.

Note that if a linear channel long enough to place a filament 38 cannot be ensured, the filament 38 may be arranged along a bent channel as illustrated in FIG. 6. In the example of FIG. 6, both ends of the filament 38 are fixed by conductive pins 54 while intermediate parts of the filament 38 are hooked on insulating pins 56 to be bent and folded back multiple times, so that one filament 38 has multiple parts bent along the shape of the channel.

An example of the metal wire forming the filament 38 is a tungsten-rhenium alloy line. An example of the material of the cell block 34 is stainless steel (e.g., SUS314 or SUS316).

In some cases, a chip-type cell block 34 is formed by the MEMS technique. Examples of such cases are illustrated in FIGS. 7A, 7B, 8A, and 8B. In these cases, a filament 38 is configured of a metal film pattern formed on a base 62 made of materials such as silicone and quartz glass. The filament 38 has multiple parts substantially parallel to the flow direction of a fluid, flowing through a channel 36b formed between the base 62 and a cover 64. Electrode pads 66 for electrically connecting with a filament drive circuit 48 and a detection circuit 50 are provided on ends of the metal film pattern that forms the filament 38.

Figure 7A:
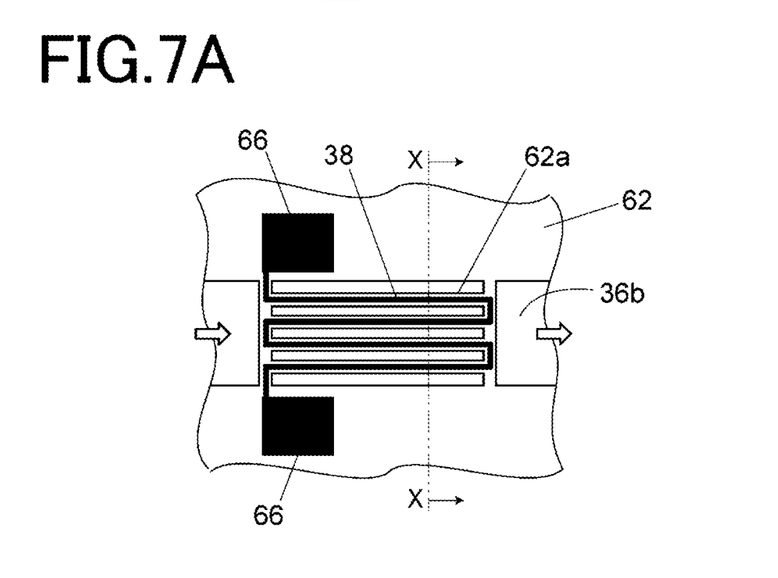
FIG. 7A is a plan view of an example of a chip-type cell block from which a cover is removed.
Figure 7B:
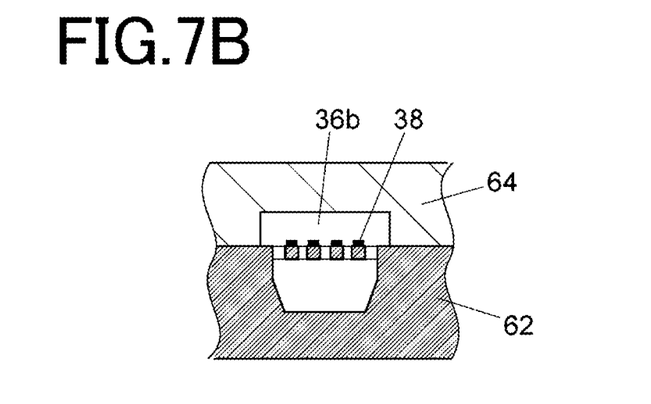
FIG. 7B is a cross-sectional view taken along position X-X of FIG. 7A.
Figure 8A:
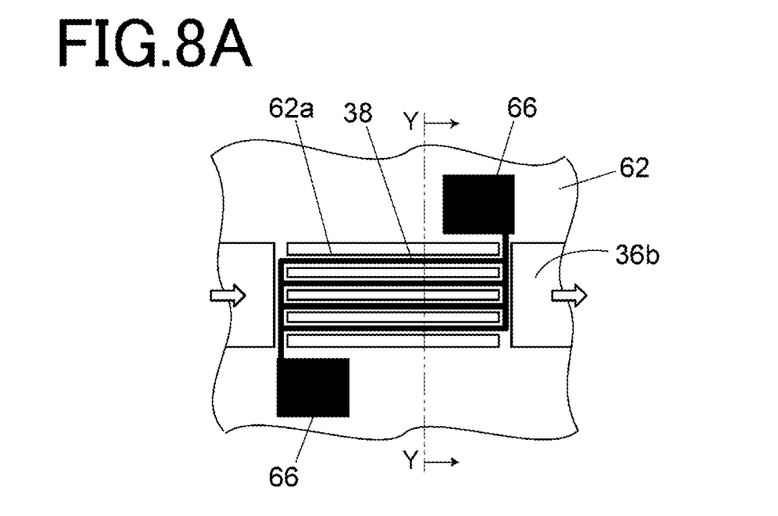
FIG. 8A is a plan view of another example of a chip-type cell block from which a cover is removed.
Figure 8B:
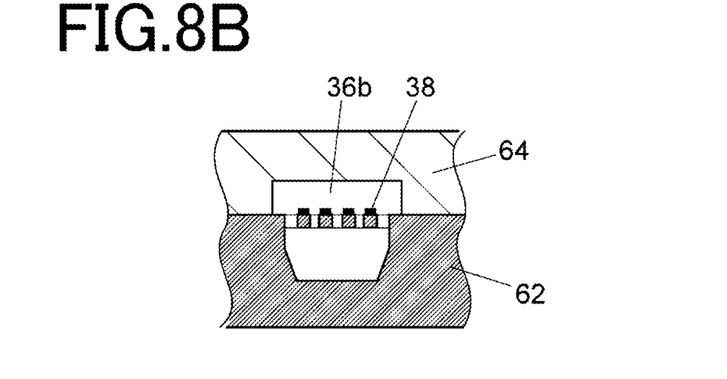
FIG. 8B is a cross-sectional view taken along position Y-Y of FIG. 8A.

In the example of FIGS. 7A and 7B, parts of the filament 38 substantially parallel to the flow direction of a fluid are connected in series. On the other hand, in the example of FIGS. 8A and 8B, parts of the filament 38 substantially parallel to the flow direction of a fluid are connected in parallel.

Next, verification results of effects of the configuration of the filament 38 will be described with reference to FIGS. 9 to 11. In this verification, the gas chromatograph of FIG. 1 was used to compare the chromatogram of a case (example) where the filament 38 was folded back twice in the flow direction of a fluid (configuration of filament 38 of FIG. 1) with an overall length of 25 mm and a folded length of 9.55 mm, and a case (comparative example) where a single linear filament having a length of 9.5 mm was placed. In this verification, 1 μL of a sample in which a 500 ppm concentration normal decan (n-Decan) is mixed was injected into normal hexane (n-Hexane) as a solvent. Analysis conditions were as follows: split analysis with a split ratio of 20, constant injection pressure at 100 kPa, 200 degrees of injection temperature, constant column oven temperature at 100 degrees, and 110° C. of detector temperature. Rtx-1 (0.25 mm inner diameter, 0.25 μm film thickness, and 30 m length) of Restek Corporation was used as a separation column 14.

Figure 9:
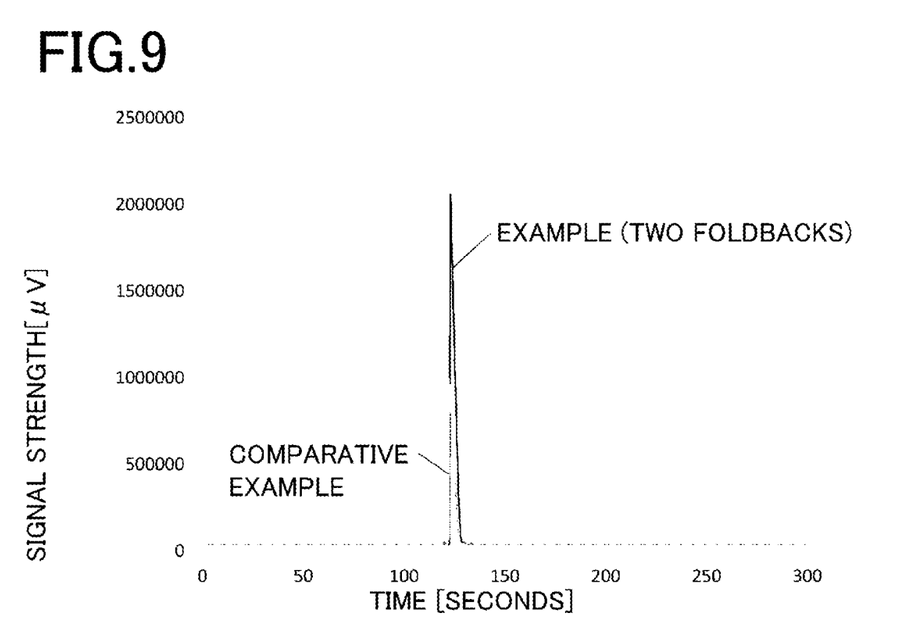
FIG. 9 is a chromatogram of an analysis between a case (example) where a filament is folded back two times in the flow direction of a fluid to increase the overall length, and a case (comparative example) of a linear filament.
Figure 10:
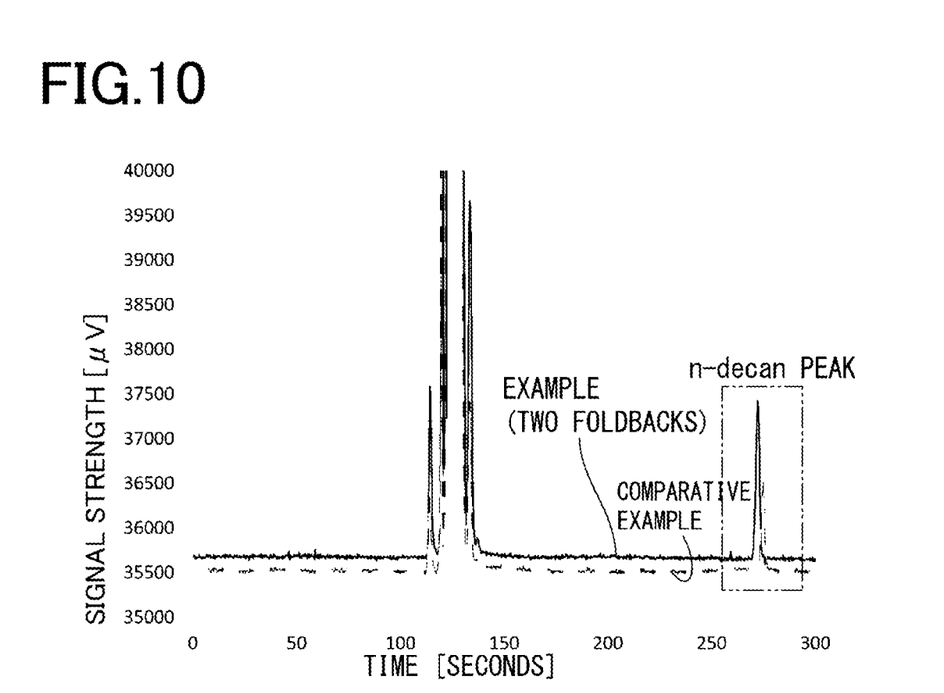
FIG. 10 is an enlarged view of a part of the chromatogram of FIG. 9 where the signal strength is 35000 to 40000.
Figure 11:
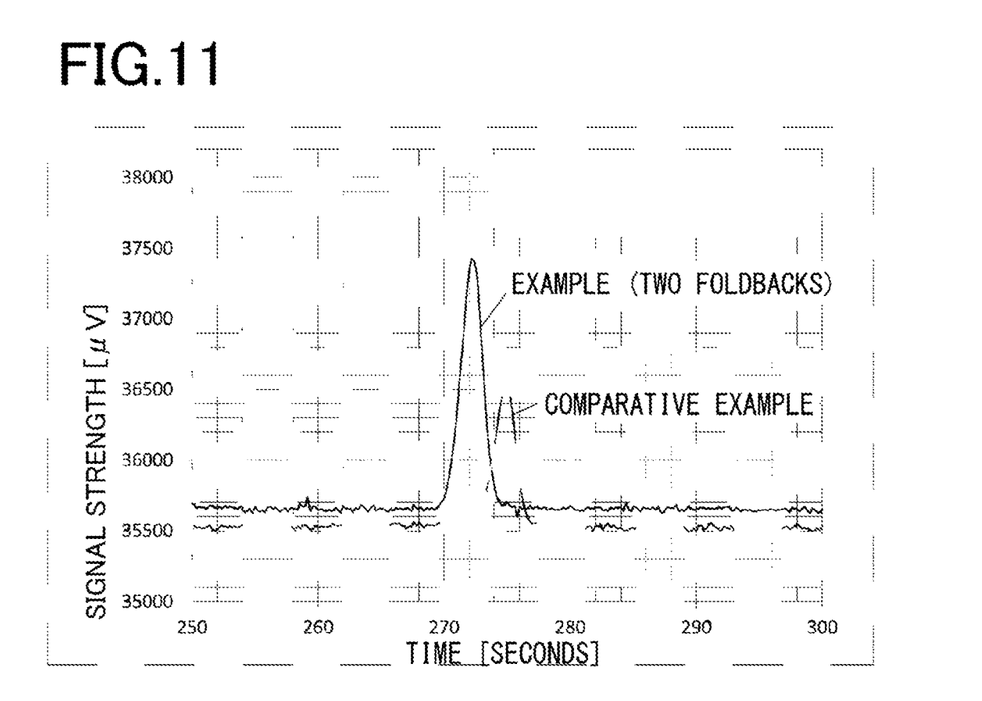
FIG. 11 is an enlarged view of an n-decan peak part of the chromatogram of FIG. 10.

FIG. 9 shows the entire chromatogram, FIG. 10 is an enlarged view of a part of FIG. 9 where the signal strength is 35000 to 40000, and FIG. 11 is a further enlargement of an n-Decan peak part of FIG. 10. As can be seen from these drawings, in the chromatogram of the example, the signal strength is larger than the comparative example, but the width of variation (noise) of the baseline is not very large.

Accordingly, it has been confirmed from this verification that by folding back the filament 38 in the flow direction of a fluid, for example, as in the example, and forming multiple parts substantially parallel to the flow direction of the fluid in the filament 38, the signal strength can be improved while an increase in noise can be suppressed. Thus, the S/N ratio can be improved.

DESCRIPTION OF REFERENCE SIGNS

1: TCD
28: Switching valve
30, 32: Channel
34: Cell block
34a, 34b, 34c: Inlet port
36: Detection channel
36a, 36b, 36c: Channel (detection channel)
38: Filament
40, 42: Discharge channel
44: Heater
45: Temperature sensor
46: Valve drive circuit
48: Filament drive circuit
50: Detection circuit
52: Frequency signal source

The invention claimed is:

1. A thermal conductivity detector (TCD) comprising:
a detection channel through which a gas to be measured flows as a fluid;
a thermal conduction part that has a filament provided in a flowing route of the fluid in the detection channel so that the filament comes into direct contact with the fluid flowing in the flowing route through the detection channel, thereby conducting heat through the fluid flowing through the detection channel; and
a detection circuit for detecting an electric signal based on a change in a voltage or a current of the filament, wherein
the filament has a plurality of filament sections that are provided substantially parallel to a flow direction of the fluid flowing through the detection channel, and that come into direct contact with the fluid flowing in the flowing route through the detection channel,
the plurality of filament sections are electrically connected with each other in series or in parallel, and
the fluid in direct contact with the plurality of filament sections flows parallel to the plurality of filament sections.

2. The TCD according to claim 1, wherein the plurality of filament sections are formed by folding back the filament at least once in a direction substantially parallel to the flow direction of the fluid flowing in the flowing route through the detection channel.

3. The TCD according to claim 1, wherein the filament is formed of a metal wire.

4. The TCD according to claim 1, wherein the filament is formed of a metal film provided on an insulating base.

5. The TCD according to claim 1, wherein the TCD further comprises a switching valve for switching paths through which a reference gas is introduced into the detection channel,
wherein the detection circuit is configured to detect the electric signal in synchronization with switching of the switching valve.

* * * * *